United States Patent [19]

Komatsu et al.

[11] Patent Number: 4,902,653
[45] Date of Patent: Feb. 20, 1990

[54] SILICON NITRIDE CERAMIC ARTICLE

[75] Inventors: Michiyasu Komatsu; Hiroyasu Ohta, both of Yokohama, Japan

[73] Assignee: Kabushiki Kaisha Toshiba, Kanagawa, Japan

[21] Appl. No.: 203,648

[22] Filed: Jun. 6, 1988

[30] Foreign Application Priority Data

Dec. 25, 1985 [JP] Japan ................... 60-290718

[51] Int. Cl.$^4$ ............. C04B 35/50; C04B 35/58
[52] U.S. Cl. ............................. 501/97; 501/98
[58] Field of Search ............. 501/87, 96, 97, 98

[56] References Cited

U.S. PATENT DOCUMENTS 4,511,525  4/1985  Tsuge et al. ................ 264/65
4,705,761  11/1987 Kosugi ........................ 501/87

FOREIGN PATENT DOCUMENTS 54-22418  2/1979  Japan ................... 501/97
58-41771  3/1983  Japan ................... 501/97
58-64269  4/1983  Japan ................... 501/97

Primary Examiner—Mark L. Bell
Attorney, Agent, or Firm—Finnegan, Henderson, Farabow, Garrett and Dunner

[57] ABSTRACT

A sintered silicon nitride ceramic article excelling in high-temperature strength and experiencing only an insignificant decline of strength at elevated temperatures particularly up to 1,300° C. is produced by firing a ceramic mixture composed of not more than 10% by weight of the oxide of a rare earth element, not more than 10% by weight of at least one member selected from the group consisting of oxides, carbides, and silicides respectively of Hf, Ta, and Nb, optionally not more than 10% by weight of aluminum nitride, and the balance being silicon nitride.

1 Claim, No Drawings

4,902,653

SILICON NITRIDE CERAMIC ARTICLE

This application is a continuation, of application Ser. No. 943,138, filed Dec. 18, 1986 abandoned.

The present application claims priority of Japanese Patent Application No. 60-290718 filed on Dec. 25, 1985.

FIELD OF THE INVENTION AND RELATED ART STATEMENT

This invention relates to a sintered silicon nitride ceramic article experiencing only an insignificant decline of strength at elevated temperatures.

Sintered ceramic articles using silicon nitride as a main component thereof possess highly satisfactory thermal stability to resist heat up to 1,900° C., exhibit a low thermal expansion coefficient, and excel in resistance to thermal shock. Owing to the possession of these fine qualities, their adaptability for gas turbine layers, nozzles, and various other parts requiring high strength and thermal stability is now being tried. Further because they exhibit a satisfactory ability of corrosionproof to metals, their actual utility as materials for protecting against fusion metal has been already under way.

Heretofore as compositions for the production of sintered silicon nitride ceramic articles, the silicon nitride-yttrium oxide-aluminum oxide system, the silicon nitride-yttrium oxide-aluminum oxide-aluminum nitride system, and the silicon nitride-yttrium oxide-aluminum oxide-titanium, magnesium, or zirconium oxide system have been known.

U.S. Pat. No. 4,407,970 issued on Oct. 4, 1983, for example, discloses a sintered silicon nitride type ceramic article experiencing only an insignificant decline of mechanical strength in an oxidizing atmosphere at elevated temperatures, which is produced by adding to the $Si_3N_4$—$Y_2O_3$—$Al_2O_3$—AlN system at least one member of the first group of oxides, i.e. $Li_2O$, BeO, CaO, $V_2O_5$, $MnO_2$, $MoO_3$, and $WO_3$ or the one member just mentioned in combination with at least one member of the second group of oxides, i.e. $B_2O_3$, MgO, $TiO_2$, $Cr_2O_3$, CoO, NiO, $ZrO_2$, $Nb_2O_5$, $HfO_2$, and $Ta_2O_5$. U.S. Pat. No. 4,412,009 issued on Oct. 25, 1983 discloses a sintered silicon nitride ceramic article using a $Si_3N_4$—$Y_2O_3$—$Al_2O_3$—AlN—$TiO_2$, MgO, or ZrO system and excelling in strength at elevated temperatures.

All these conventional compositions possibly suffer degradation of mechanical strength at temperatures exceeding 1200° C. and, destined to be exposed to such high temperatures.

OBJECT AND SUMMARY OF THE INVENTION

The inventors have found that the conventional sintered silicon nitride ceramic article can be relieved of the inevitable degradation of strength at elevated temperatures particularly above 1,300° C. by using, in the place of aluminum oxide, an oxide of a specific rare earth element, namely, a substance capable of forming a glass having a high-melting point jointly with yttrium oxide.

This invention which has been perfected based on this finding aims to provide a sintered silicon nitride ceramic article exhibiting high mechanical strength at elevated temperatures.

To be specific, the sintered silicon nitride ceramic article contemplated by the present invention is characterized by the fact that it is produced by firing a ceramic mixture consisting essentially of not more than 10% by weight (excluding the 0 content) of the oxide of a specific rare earth element, not more than 10% by weight (excluding the 0 content) of at least one member selected from the group consisting of oxides, carbides or silicides respectively of Hf, Ta, and Nb, and optionally not more than 10% by weight (excluding the 0 content) of aluminum nitride, and the balance to make up to 100% by weight of silicon nitride.

As concrete examples of the oxide of rare earth element to be used as one of the additive components of this invention, yttrium oxide and cerium oxide can be cited. These oxides of rare earth elements function as agents for promoting the sintering. This additive component is incorporated in the ceramic mixture in an amount of not more than 10% by weight, preferably not more than 5% by weight, based on the total amount of the ceramic mixture. Use of this additive component in any exceeding 10% by weight is undesirable because it possibly results in impairment of the mechanical strength and the resistance to thermal shock of the sintered article.

The oxide, carbide, or silicide of Hf, Ta, or Nb which is another additive component of this invention forms a glass having a high-melting point at elevated temperatures jointly with the oxide of the rare earth element as described above and function as an agent for promoting the sintering. At least one of the compounds mentioned above is incorporated in the ceramic mixture in an amount of not more than 10% by weight, preferably 5% by weight, for example, 2% by weight. The lower limit of the amount of this additive component is desired to be in the range of 0.1 to 0.5% by weight. When two or more of these compounds are jointly used, the total amount of the additive components is desired to be not more than 15% by weight.

Besides the aforementioned additive components, the ceramic mixture of this invention may optionally incorporate therein not more than 10% by weight, preferably not more than 5% by weight, of aluminum nitride. The aluminum nitride thus additionally incorporated contributes to heightening the mechanical strength at elevated temperatures and promoting the sintering is carried out under atmospheric pressure. If this compound is used in any amount exceeding the upper limit mentioned above, the excessive incorporation of the compound proves undesirable because it lowers the resistance to thermal shock and degrades the strength at normal room temperature.

The total amount of these additive components as sintering aid is desired to be not more than 15% by weight based on the amount of the ceramic mixture.

In accordance with the present invention, a mixture incorporating the aforementioned components in a prescribed percentage composition is molded in a stated shape and the molded mixture is sintered in a non-oxidizing atmosphere at a temperature in the range of 1,650° to 1,850° C.

In the sintering of this invention, non-oxidizing gas such as nitrogen gas or argon is selected for the formation of an atmosphere for enveloping the site of sintering. This is because, in an oxygen-containing atmosphere, silicon nitride is oxidized into $SiO_2$ at elevated temperatures and the production of a sintered silicon nitride ceramic article excellent in high-temperature strength as is not obtained as expected. In this case, the sintering can be carried out by the atmospheric pressure process. It may be performed otherwise by any of the known processes such as the hot press process, the pressed atmosphere process, the hot hydrostatic pressure process (HIP). As a result, there can be obtained a sintered silicon nitride ceramic article of high density excellent in high-temperature mechanical strength and resistance to thermal shock.

DETAILED DESCRIPTION OF PREFERRED EMBODIMENTS

Now, the present invention will be described more specifically below with reference to working examples.

EXAMPLE 1

A mixed powder was prepared by combining 93.4% by weight of silicon nitride powder having an α-type content of 95% and having an average particle diameter of 0.8 μm, 4.7% by weight of yttrium oxide powder having an average particle diameter of 0.9 μm, and 1.9% by weight of hafnium oxide powder having an average particle diameter of 1 μm, press molded under a pressure of 1 t/cm$^2$, and then subjected to hot press sintering in an atmosphere of nitrogen gas at 1,750° C. under 400 kg/cm$^2$ for 60 minutes, to produce a sintered silicon nitride ceramic article measuring 50 mm×50 mm×5 mm (thickness).

EXAMPLES 2-5

Sintered silicon nitride ceramic article were produced by following the procedure of Example 1, excepting tantalum oxide, niobium oxide, hafnium carbide, and hafnium silicide were added each in an equal amount as shown in the following table in the place of hafnium oxide.

In Comparative Experiment 1, a sintered silicon nitride ceramic article was produced by following the procedure of Example 1, excepting aluminum oxide was used in an equal amount in the place of hafnium oxide.

EXAMPLE 6

A mixed powder was prepared by combining 90.9% by weight of silicon nitride powder having an α-type content of 95% and having an average particle diameter of 0.8 μm, 4.5% by weight of yttrium oxide having an average particle diameter of 0.9 μm, 1.8% by weight of hafnium oxide powder having an average particle diameter of 1 μm, and 2.7% by weight of aluminum nitride powder having an average particle diameter of 1 μm, press molded under a pressure of 1 t/cm$^2$, and then subjected to sintering under atmospheric pressure in an atmosphere of nitrogen gas at 1,800° C. for 120 minutes, to produce a sintered silicon nitride ceramic article measuring 50 mm×50 mm×5 mm (thickness).

In comparative Experiment 6, a sintered silicon nitride ceramic article was produced by following the procedure of Example 6, excepting aluminum oxide was used in an equal amount in the place of hafnium oxide.

The sintered silicon nitride ceramic articles produced as described above were tested for flexural strength at room temperature, 1,200° C., and 1,300° C.

The flexural strength was determined by cutting test pieces measuring 3×3×30 (mm) from a given sintered article and measuring three-point bending strength at a cross head speed of 0.05 mm/min with a span of 20 mm. It was reported as an average of the values obtained of four test pieces.

The results were as shown in the following table.

TABLE

|  | Additive component | Flexural strength (kg/mm$^2$) | | |
| --- | --- | --- | --- | --- |
|  |  | Room temperature | 1,200° C. | 1,300° C. |
| Example 1 | HfO$_2$ | 105 | 115 | 115 |
| 2 | Ta$_2$O$_5$ | 120 | 110 | 108 |
| 3 | Nb$_2$O$_5$ | 110 | 105 | 105 |
| 4 | HfC | 108 | 118 | 120 |
| 5 | HfSi | 110 | 115 | 118 |
| Comparative Experiment 1 | Al$_2$O$_3$ | 110 | 80 | 50 |
| Example 6 | HfO$_2$ | 110 | 95 | 80 |
| Comparative Experiment 6 | Al$_2$O$_3$ | 105 | 80 | 50 |

It is noted from the table that the sintered silicon nitride ceramic articles conforming with the present invention were notably improved over those of the conventional method in terms of impairment of strength at elevated temperatures, particularly at 1,300° C.

As described above, the sintered silicon nitride ceramic article produced in accordance with the present invention excel in mechanical strength at elevated temperatures up to 1,300° C. and are advantageously used as structural materials destined to be exposed to elevated temperatures.

What is claimed is:

1. A sintered silicon nitride ceramic article, consisting essentially of not more than 10% by weight (excluding the 0 content) of an oxide of a rare earth element, not more than 5% by weight (excluding the 0 content) of hafnium oxide, not more than 5% by weight (excluding the 0 content) of aluminum nitride, and the balance being silicon nitride.

* * * * *